UNITED STATES PATENT OFFICE.

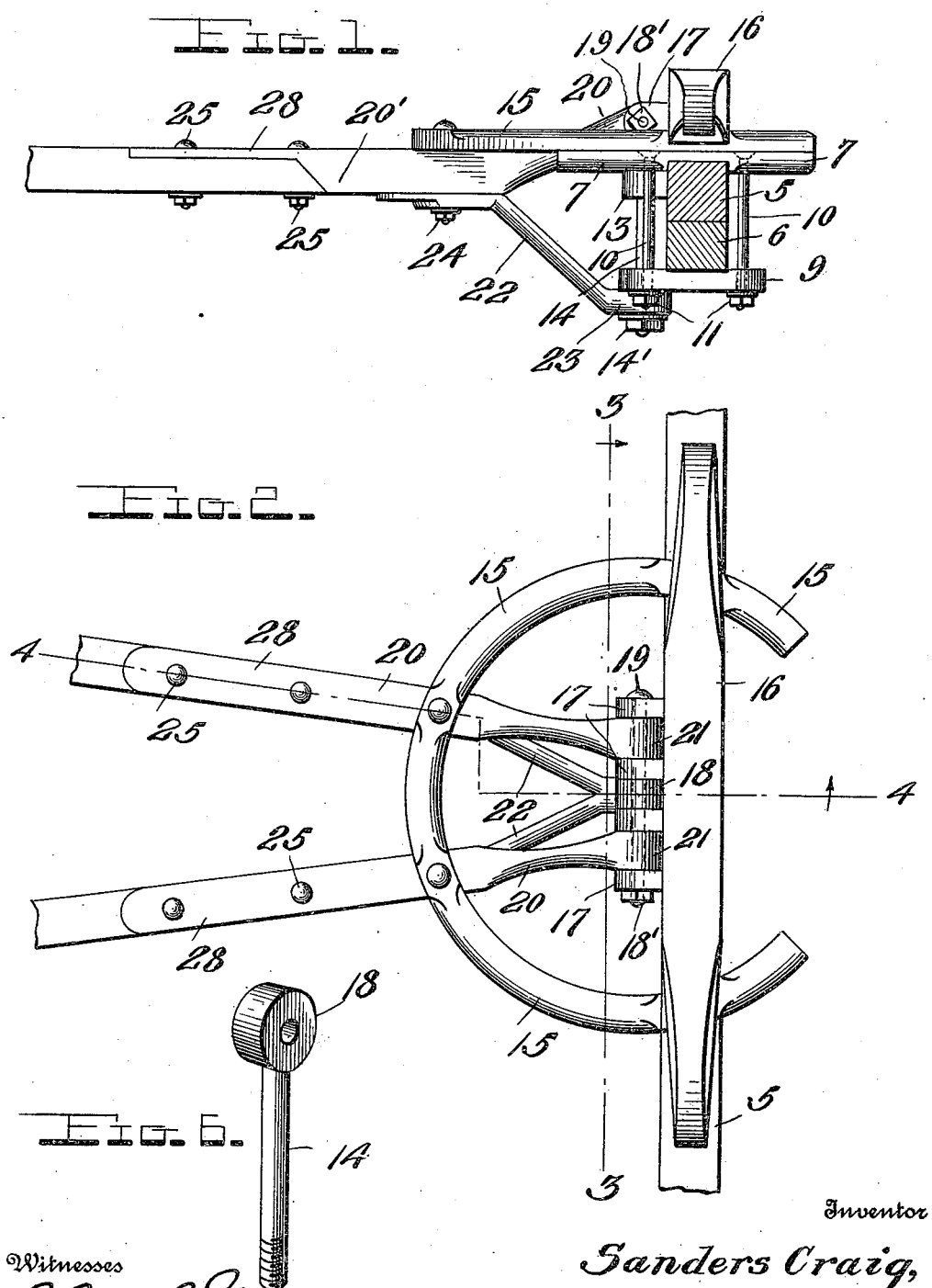

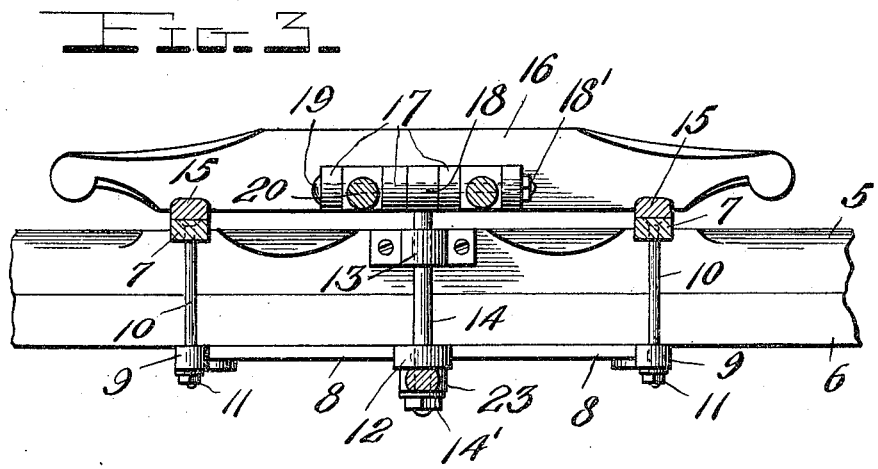
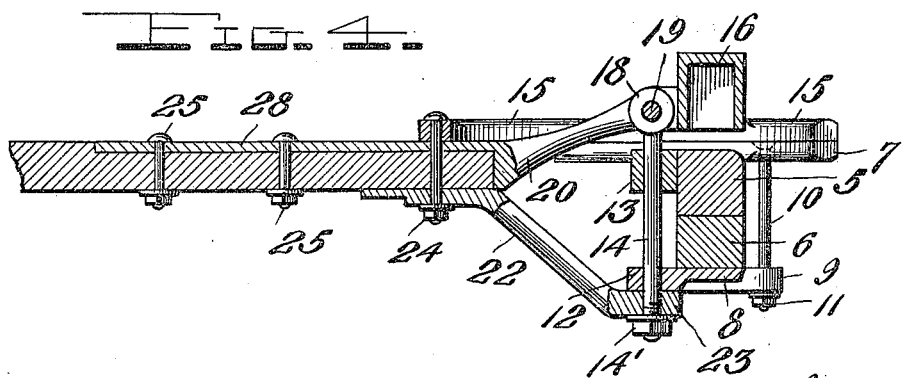
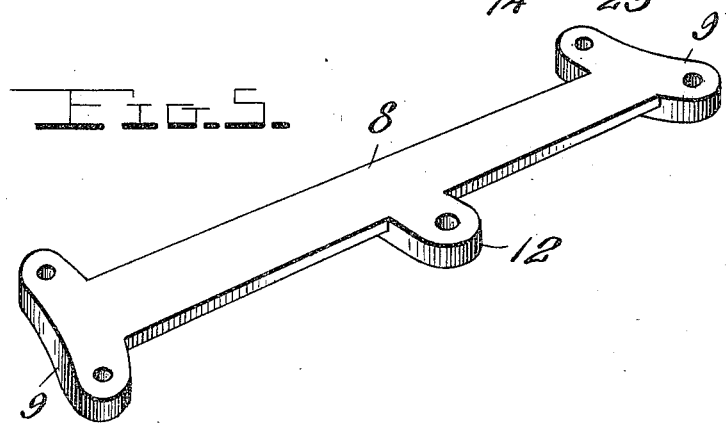

SANDERS CRAIG, OF SAN DIEGO, CALIFORNIA.

FIFTH-WHEEL.

961,844.  Specification of Letters Patent.  Patented June 21, 1910.

Application filed December 27, 1909. Serial No. 534,946.

*To all whom it may concern:*

Be it known that I, SANDERS CRAIG, a citizen of the United States, residing at San Diego, in the county of San Diego and State of California, have invented certain new and useful Improvements in Fifth-Wheels, of which the following is a specification, reference being had to the accompanying drawings.

This invention relates to certain new and useful improvements in fifth wheels for vehicles and has for its object to provide a device of this character of very simple construction which may be easily and quickly attached or detached to or from the sand board.

Another object is to provide a new and improved means for mounting the fifth wheel whereby the supporting structure for the vehicle body will not be weakened by the necessity of employing a multiplicity of bolts or other fastening devices.

A further object resides in the provision of a device of the above character which may be manufactured at a minimum expense, and one which is strong and durable in construction and highly efficient in its operation.

With these and other objects in view, the invention consists of the novel construction, combination and arrangement of parts hereinafter fully described and claimed, and illustrated in the accompanying drawings, in which—

Figure 1 is a side elevation of the sand board showing my improved fifth wheel attached thereto, the body of the vehicle being removed; Fig. 2 is a top plan view; Fig. 3 is a section taken on the line 3—3 of Fig. 2; Fig. 4 is a detail vertical section taken on the line 4—4 of Fig. 2; Fig. 5 is a detail perspective view of the lower attaching plate arranged beneath the bolster; and Fig. 6 is a detail perspective view of the king bolt.

Referring more particularly to the drawings 5 indicates the sand board which is arranged beneath the body of the vehicle. The vehicle axle 6 is arranged beneath the sand board and extends beyond the opposite ends thereof. The vehicle wheels are mounted upon the ends of the axle in the usual manner. The arcuate arms 7 are secured in the top of the sand board adjacent each end. These arms project forwardly and rearwardly from the sand board and are adapted to engage with and move upon the under surface of the fifth wheel as will hereinafter appear. An attaching plate 8 is disposed beneath the vehicle axle and is formed at each of its ends with the laterally extending ears 9. Bolts 10 extend through these ears and have their upper ends headed and countersunk in the arms 7. Suitable securing nuts 11 are threaded upon the lower ends of these bolts whereby the plate 8 and the arms 7 are securely held in position. Centrally formed upon the plate 8 and extending rearwardly thereof is an ear 12, and a bearing 13 is also secured to the rear side of the sand board 5. Through these bearings the king bolt 14 is adapted to extend and is connected to the fifth wheel structure in a manner which will now be specifically set forth.

The fifth wheel proper consists of a semicircular bar 15 which is adapted to be disposed and supported upon the laterally extending arcuate arms 7 carried by the sand board. A transverse bar or head block 16 is secured to the wheel and is normally disposed immediately above the sand board 5. It will be noted from reference to Fig. 4 that the head block is of hollow rectangular construction, and is preferably cast in one piece. This block has integrally formed therewith and extending laterally and rearwardly therefrom a plurality of spaced ears 17. Between the intermediate ears the upper end of the king bolt 14 is disposed. This end of the king bolt is in the form of an eye 18 and is adapted to be secured between said ears by means of a transversely extending bolt 19 which is positioned through the openings of the ears and through said eye. The spaces provided between the end ears and those next adjacent thereto are adapted to receive the inner ends of the diverging supporting bars 20. These ends of the bars are also formed with eyes 21 and the securing bolt is also disposed therethrough. Thus it will be seen that this bolt not only holds the king pin 14 upon which the running gear of the vehicle oscillates, but also secures the transverse supporting head block and the supporting bars 20 rigidly together, thereby providing an extremely substantial supporting structure. The forward ends of the supporting bars it will be noted are inclined upwardly, and in order to counteract the liability of thus weakening the structure, I provide the V-shaped member 22 which extends downwardly and forwardly from the supporting bars immediately beneath the fifth wheel. Bolts extend through the ends of this member, the supporting bars and the fifth wheel and receive the nuts 24 upon their lower ends whereby these elements are rigidly secured together. The lower connected ends of the diverging bars of the V-shaped member are formed with an opening to receive the lower end of the king bolt 14. A suitable cap nut 14' is threaded upon the lower end of the king bolt and retains the same in its bearings. A similar nut 19' is also threaded upon one end of the attaching bolt 19 to secure the same in the ears 17.

It will be noted that the supporting bars 20 are formed intermediate of their ends with the side flanges 20' thereby providing a bar or channel formation whereby the weight of said bars is materially decreased without affecting their durability to any appreciable extent. The rear ends of these supporting bars are in the form of attaching plates 28 through which suitable attaching bolts 25 are adapted to extend whereby the device may be rigidly attached to the running gear of the vehicle.

In the operation of the device, the wheel may be very quickly arranged in position on the sand board by first inserting the king bolt 14 in the bearings and positioning its upper end between the ears formed upon the transverse head block. The attaching pin 19 is then passed through the ears and the eye in the upper end of said bolt and through the ends of the diverging supporting bars 20, the lower end of the king bolt being disposed through the outer end 23 of the V-shaped member 22. The nuts are then engaged upon the ends of the king bolt and the attaching bolt and the device is ready for use. It will thus be seen that the necessity for removing a large number of attaching bolts as required in the present construction of devices of this character, is eliminated and the fifth wheel may be readily removed from the sand board for the purpose of repairs or in order to lubricate the same and as easily and quickly replaced thereon.

From the foregoing it is believed that the many advantages to be attained from the device constructed in the manner above set forth will be apparent without requiring a more extended description. The device is very simply constructed, is extremely strong and durable in use and highly efficient in its operation.

While I have shown and described what I consider the preferable form of my invention, it will be obvious that the same is susceptible to a great many minor modifications without materially departing from the essential features or sacrificing any of the advantages thereof.

Having thus described the invention, what is claimed is:

1. In a device of the character described, the combination with a sand board and vehicle axle, a fifth wheel disposed upon said sand board, a transversely disposed head block carried by said wheel, ears extending from said block, supporting bars carried by said wheel and secured to the running gear, a plate secured to the axle having an apertured ear centrally formed thereon, a king bolt having its upper end removably secured between the ears on said sand board, the lower end of said bolt being disposed through the apertured ear of said plate, and means for detachably connecting the ends of the supporting bars to the head block, said means engaging the king bolt to retain the head block on the sand board.

2. In a device of the character described, the combination with a sand board and vehicle axle, of a fifth wheel disposed upon said sand board, a head block carried by said wheel, supporting bars carried by said wheel and secured to the running gear of the vehicle, said head block having a plurality of spaced ears extending rearwardly therefrom, an apertured ear extending rearwardly from the center of the vehicle axle, a king bolt having an eye formed upon its upper end disposed between the ears on said head block, a bearing on the sand board for said bolt, the lower end of said king bolt being disposed through the apertured ear on said axle, means for removably securing the king bolt in said ears, and means connecting the lower end of said king bolt and the supporting bars.

3. In a device of the character described, the combination with a sand board and vehicle axle, of an attaching plate arranged beneath said axle, lateral arms seated in the top of said sand board, and extending forwardly and rearwardly therefrom, bolts rigidly connecting said arms and plate, a fifth wheel movably mounted upon said arms, a transversely positioned head block carried by said wheel, a plurality of ears extending rearwardly from said head block, supporting bars carried by the wheel disposed between adjacent ears, a king bolt having its upper end disposed between the intermediate ears, bearings for said bolt, means connecting the lower end of said bolt and said supporting bars, a transverse bolt removably disposed through said ears, supporting bars, and king bolt, a nut removably threaded upon one end of said bolt, and a nut threaded upon the lower end of the king bolt to removably secure the same in its bearings.

4. In a device of the character described, the combination with a sand board and axle, laterally extending arcuate arms seated in said sand board, an attaching plate disposed beneath the axle having laterally extending ears at each of its ends, attaching bolts connecting said ears and arms, a central bearing integrally formed with said plate and extending rearwardly thereof, a fifth wheel mounted upon said arms, a head block carried thereby, rearwardly and laterally extending ears integrally formed with said head block, rearwardly extending diverging supporting bars having their inner ends disposed between adjacent ears, a bearing carried by the sand board, a king bolt removably disposed in the bearing on said sand board and the bearing on said plate, the upper end of said king bolt having an eye formed thereon disposed between the intermediate ears, an attaching bolt extending through said ears, the ends of said bars and the eye of said king bolt and having a nut threaded upon one end thereof, a V-shaped member having the ends of its diverging arms disposed upon said supporting bars, the connected ends of said arms having an aperture therethrough to receive the king bolt, a nut threaded upon the lower end of said king bolt, said supporting bars being formed intermediate of their ends with a longitudinal channeled portion, and bolts extending through the rear ends of said V-shaped member, the channeled portions of said bars and the fifth wheel.

In testimony whereof I hereunto affix my signature in the presence of two witnesses.

SANDERS CRAIG.

Witnesses:
　C. M. FORREST,
　E. M. RICKETTS.